(12) United States Patent  
Seto et al.

(10) Patent No.: US 7,519,128 B2
(45) Date of Patent: *Apr. 14, 2009

(54) MIMO TRANSMISSION AND RECEPTION METHODS AND DEVICES

(75) Inventors: Ichiro Seto, Fuchu (JP); Tsuguhide Aoki, Kawasaki (JP); Hiroshi Yoshida, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/060,647

(22) Filed: Apr. 1, 2008

(65) Prior Publication Data

US 2008/0212704 A1 Sep. 4, 2008

Related U.S. Application Data

(62) Division of application No. 11/016,808, filed on Dec. 21, 2004, now Pat. No. 7,415,074.

(30) Foreign Application Priority Data

Jan. 9, 2004 (JP) ............................. 2004-004848

(51) Int. Cl.
  H04B 7/02 (2006.01)
  H04L 1/02 (2006.01)
(52) U.S. Cl. .................. 375/267; 375/260; 455/59; 455/132; 455/133; 455/137; 455/138; 455/139; 455/140; 455/141
(58) Field of Classification Search .............. None
  See application file for complete search history.

(56) References Cited

U.S. PATENT DOCUMENTS

| | | | | |
|---|---|---|---|---|
| 5,497,398 | A | | 3/1996 | Tzannes et al. |
| 5,982,327 | A | * | 11/1999 | Vook et al. ........... 342/380 |
| 6,160,791 | A | * | 12/2000 | Bohnke ................ 370/208 |
| 6,917,311 | B2 | * | 7/2005 | Hosur et al. ............ 341/50 |
| 6,985,434 | B2 | * | 1/2006 | Wu et al. .............. 370/208 |
| 7,233,625 | B2 | * | 6/2007 | Ma et al. .............. 375/260 |
| 7,386,072 | B2 | * | 6/2008 | Uno ................... 375/344 |

(Continued)

FOREIGN PATENT DOCUMENTS

JP 2002-236313 8/2000

(Continued)

OTHER PUBLICATIONS

Jan Boer, et al., "Backwards compatibility", ftp://ieee: wireless@ftp.802wirelessworld.com, IEEE 802.11-0714r0, Sep. 2003, 7 pages.

(Continued)

Primary Examiner—Shuwang Liu
Assistant Examiner—Gina McKie
(74) Attorney, Agent, or Firm—Oblon, Spivak, McClelland, Maier & Neustadt, P.C.

(57) ABSTRACT

In a wireless transmitting device which performs transmission by an OFDM using a plurality of subcarriers orthogonal to each other, a plurality of preambles to which a plurality of different subcarrier groups selected from a plurality of subcarriers within an OFDM signal band are allocated are transmitted by using a plurality of transmit antennas, and data is transmitted by using the antennas after the preambles are transmitted.

4 Claims, 11 Drawing Sheets

U.S. PATENT DOCUMENTS

| | | | |
|---|---|---|---|
| 2002/0191535 A1* | 12/2002 | Sugiyama et al. | 370/208 |
| 2004/0005018 A1 | 1/2004 | Zhu et al. | |
| 2005/0084030 A1* | 4/2005 | Zhou et al. | 375/267 |
| 2005/0163081 A1 | 7/2005 | Aoki et al. | |
| 2005/0180313 A1* | 8/2005 | Kim et al. | 370/208 |
| 2005/0180515 A1* | 8/2005 | Orihashi et al. | 375/260 |
| 2005/0201268 A1 | 9/2005 | Aoki et al. | |
| 2005/0220208 A1 | 10/2005 | Aoki | |
| 2006/0007891 A1 | 1/2006 | Aoki et al. | |
| 2006/0034389 A1 | 2/2006 | Aoki | |
| 2006/0270364 A1 | 11/2006 | Aoki | |
| 2007/0153928 A1* | 7/2007 | Liu et al. | 375/260 |

FOREIGN PATENT DOCUMENTS

| | | |
|---|---|---|
| JP | 2001-148676 | 5/2001 |
| WO | WO 01/71928 A2 | 9/2001 |

OTHER PUBLICATIONS

Yasutaka Ogawa, et al., "A Mimo-OFDM System for High-Speed Transmission", Vehicular Technology Conference on, USA, vol. 1, Oct. 9, 2003, pp. 493-497.

* cited by examiner

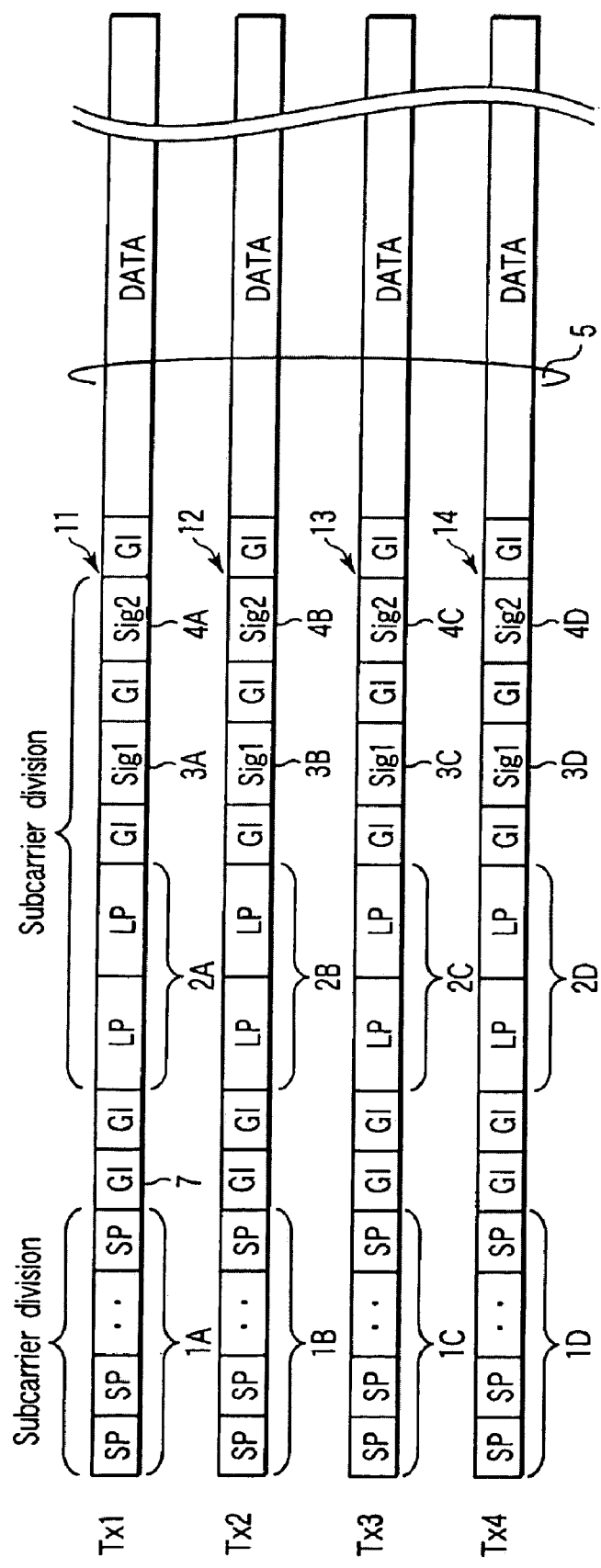
F I G. 1

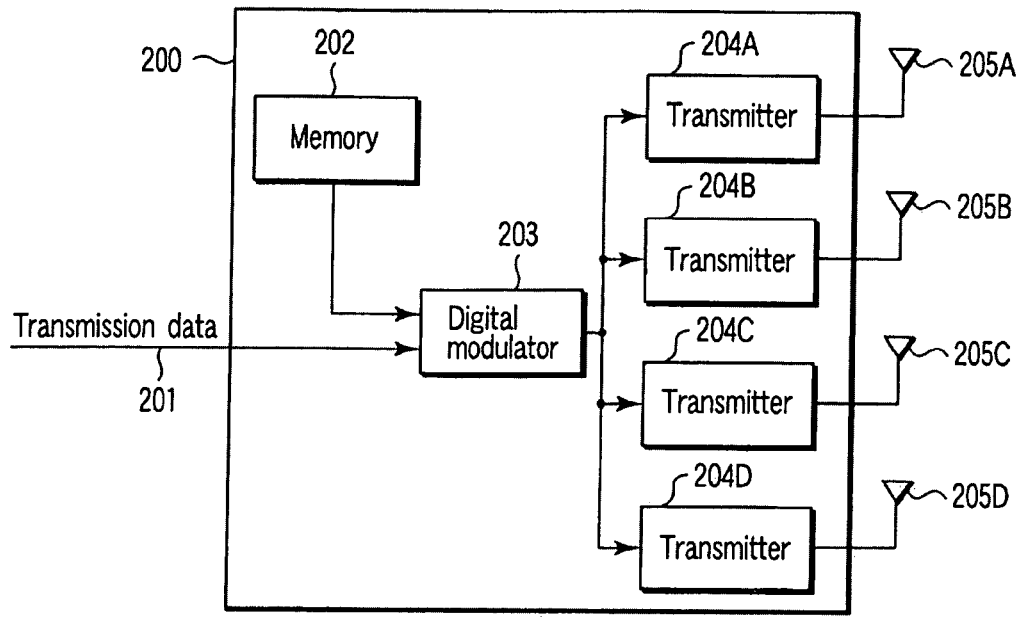
F I G. 2
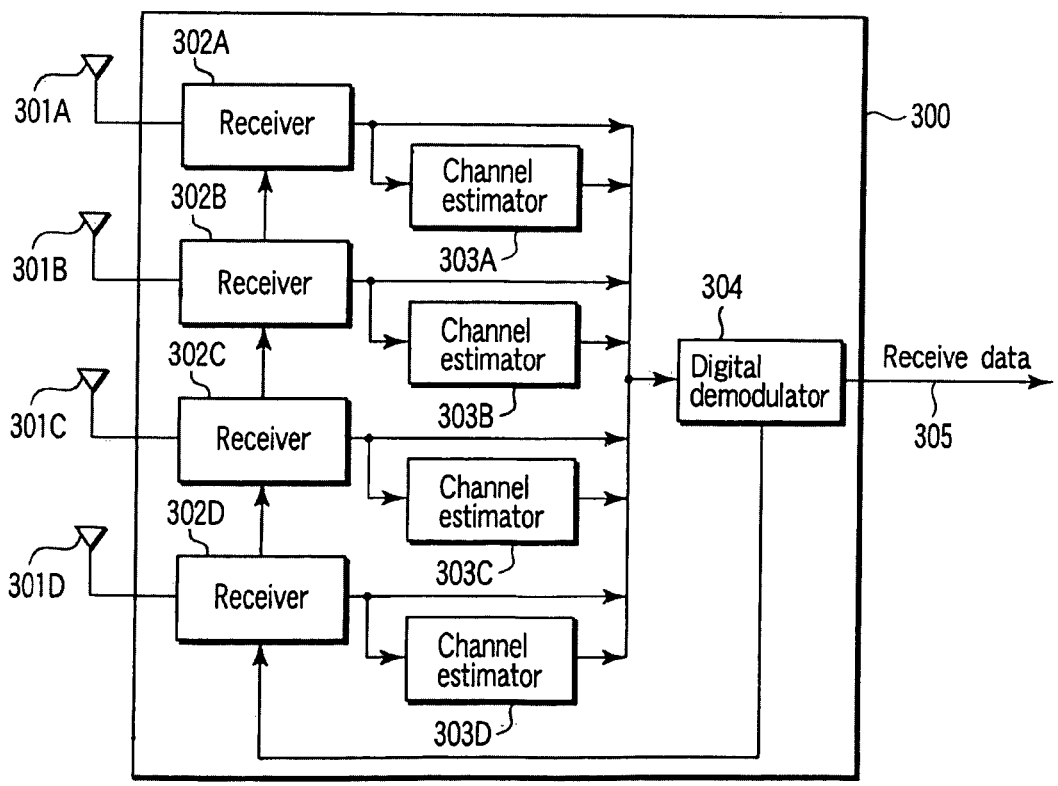
F I G. 3

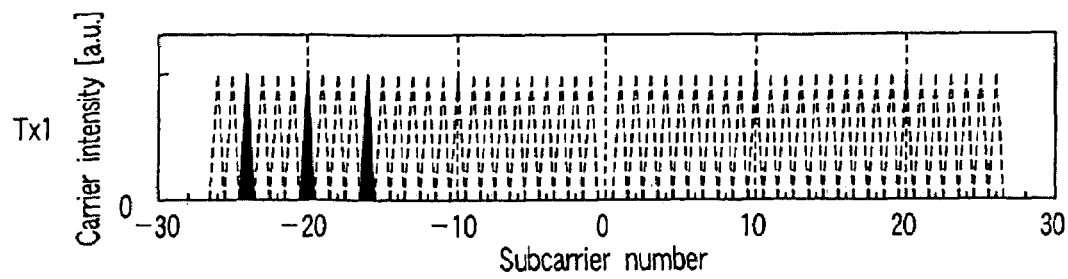
F I G. 12A
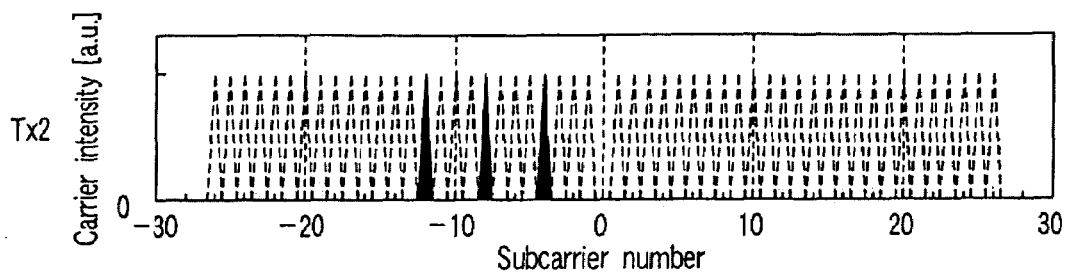
F I G. 12B
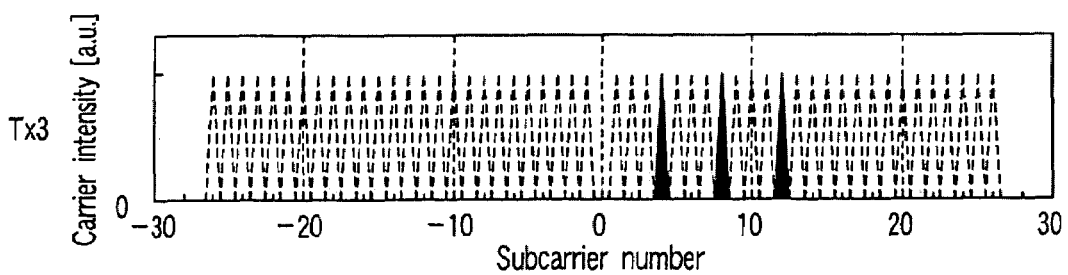
F I G. 12C
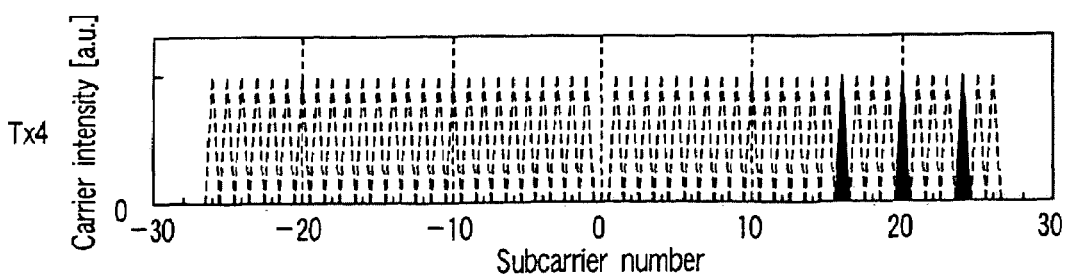
F I G. 12D

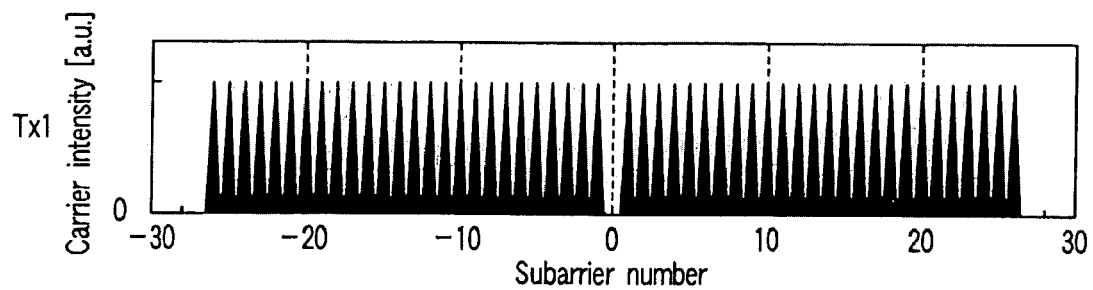
F I G. 14A
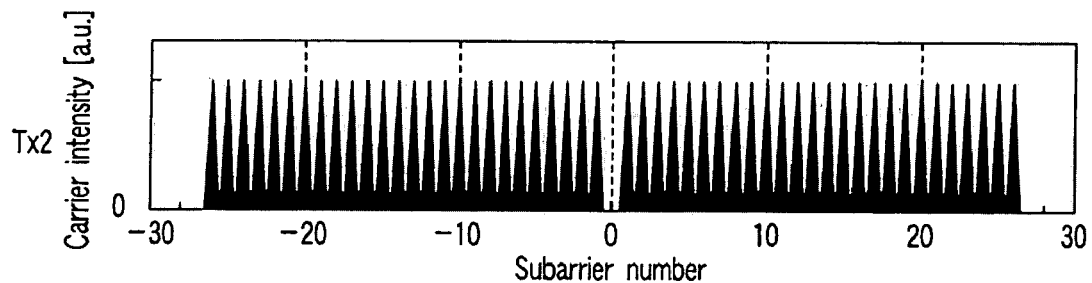
F I G. 14B
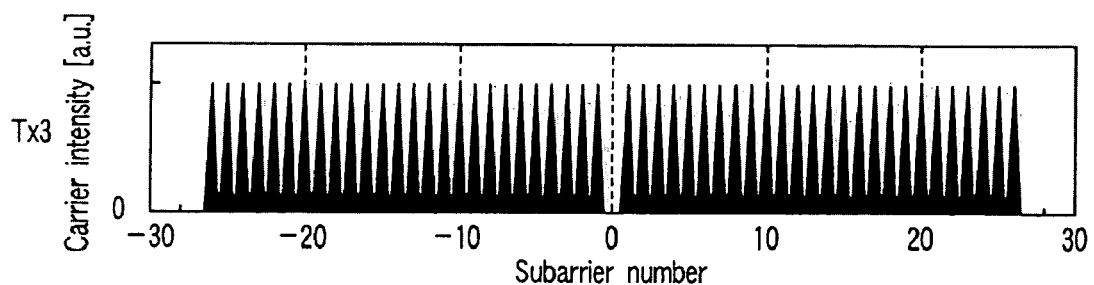
F I G. 14C
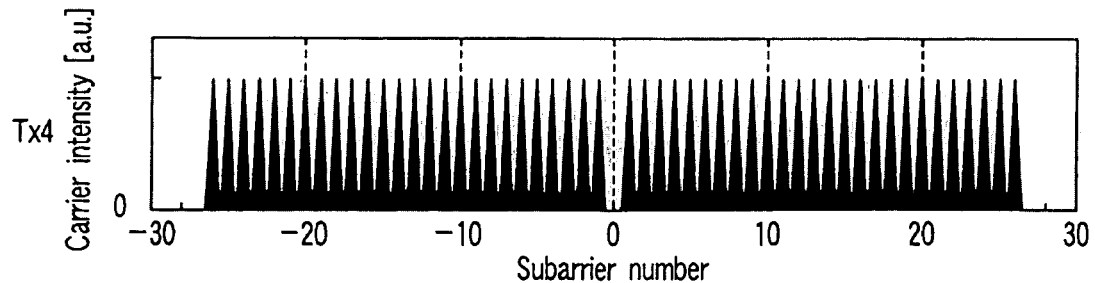
F I G. 14D

MIMO TRANSMISSION AND RECEPTION METHODS AND DEVICES

CROSS-REFERENCE TO RELATED APPLICATIONS

The present application is a divisional of application Ser. No. 11/016,808, filed on Dec. 21, 2004, which claims the benefit of priority from prior Japanese Patent Application No. 2004-004848, filed Jan. 9, 2004. The entire contents of each of the above applications are incorporated herein by reference.

BACKGROUND OF THE INVENTION

1. Field of the Invention

The present invention relates particularly to a wireless transmitting device, wireless receiving device, wireless transmitting method and wireless receiving method by which preamble are transmitted before data.

2. Description of the Related Art

The institute of Electrical and Electronics Engineers (IEEE) is establishing a wireless LAN standard called IEEE 802.11n which aims at a throughput of 100 Mbps or more. In IEEE 802.11n, a technique called multi-input multi-output (MIMO) which uses a plurality of antennas at transmitters and receivers, may be adopted. IEEE 802.11n is required to coexist with the existing IEEE 802.11a. In the MIMO technique, to measure responses (called channel impulse responses) of channel impulse response from a plurality of transmit antennas to each receiving antenna, a preamble as a known sequence must be transmitted from these transmit antennas.

In a preamble proposed by Jan Boer et al. in "Backwards compatibility", IEEE 802.11-03/714r0 (Jan Boer, "Backwards compatibility", IEEE 802.11-03/714r0, Section 2, Slide 14 to 19, (URL:ftp://ieee:wireless@ftp.802wirelessworld.com/)), Paragraph 2 "Diagonally loaded preamble", a short preamble sequence for performing timing synchronization and automatic gain control (AGC) is transmitted from a single transmit antenna. After that, a long preamble sequence for estimating channel impulse response is transmitted from a plurality of transmit antennas. The receiving side performs automatic frequency control (AFC) by using the short preamble sequence and long preamble sequence, and estimates channel impulse response between the antennas. In this manner, the MIMO technique is used in transmission of data signals and the like after that. That is, after the long preamble sequence, a signal field indicating the arrangement of a data signal, e.g., the modulation coding scheme and length of a wireless packet is transmitted, and then the data signal is transmitted.

Jan Boer et al. describe only that the short preamble sequence is transmitted from one antenna and the long preamble sequence is divided into subcarriers and transmitted from a plurality of antennas, and do not describe any signal field transmission method. The preamble proposed by Jan Boer at al. is the same, in a portion from the short preamble sequence to the signal field, as the preamble of IEEE 802.11a standard based on transmission from a single antenna. Therefore, a wireless receiver based on IEEE 802.11a standard which has received the proposed preamble can recognize that the received packet is a wireless packet based on IEEE 802.11a. Accordingly, the proposed preamble allows IEEE 802.11n and IEEE 802.11a standards to coexist on a single wireless station.

The short preamble sequence is transmitted as an orthogonal frequency division multiplexing (OFDM) signal from a single antenna. The long preamble sequence is transmitted, from a plurality of antennas, as different subcarriers divided from one OFDM signal. Likewise, the signal field is transmitted, from the plurality of antennas, as subcarriers divided from one OFDM signal. Since the long preamble sequence is transmitted by dividing one OFDM signal into subcarriers as described above, the receiving side can simultaneously estimate channel impulse response.

In the OFDM receiver apparatus, a received signal is generally demodulated by digital signal processing, so an analog to digital converter is prepared to convert an analog received signal into a digital signal. This analog to digital converter has an allowable level range (called an input dynamic range) permitted to an analog signal to be converted. Therefore, AGC by which the level of a received signal falls within the input dynamic range of the analog to digital converter is essential.

In the preamble by Jan Boer et al., channel estimation is performed by using the long preamble. Since this channel estimation is done by digital signal processing, AGC must be performed by using the short preamble sequence which is a signal before the long preamble sequence. That is, the received level of the short preamble sequence is measured by a receiver connected to each receiving antenna, and the input level of the analog to digital converter is adjusted on the basis of this received level.

Unfortunately, other transmit antennas than the transmit antenna which transmits the short preamble sequence transmit nothing before the long preamble sequence. To receive the long preamble sequence, therefore, AGC must be performed by using the short preamble transmitted from the single transmit antenna. Accordingly, when the receiving side receives the long preamble sequence transmitted from the other transmission antennas or receives a data signal, the received level becomes much higher or lower than the level adjusted by AGC using the short preamble sequence transmitted from the single transmit antenna. If the received level is higher than the upper limit of the input dynamic range of the analog to digital converter, the analog to digital converter saturates. If the received level is lower than the lower limit of the input dynamic range, the analog to digital converter produces a large quantization error. In either case, the analog to digital converter cannot appropriately convert a signal, and this adversely affects processing after the conversion.

Also, since a data signal is transmitted from the plurality of transmit antennas, the changing range of the received level in the interval of the data signal further increases. Accordingly, the problems of the saturation and quantization error of the analog to digital converter described above become significant, and the receiving performance greatly deteriorates.

Generally, a wireless apparatus desirably holds the output level of a transmission signal constant. Assume that the number of transmit antennas is N, and the transmission output is $\alpha$ [watts]. In a wireless communication system obtained by combining the MIMO technique and OFDM, i.e., in a so-called MIMO-OFDM system, the transmission output of a single antenna must be $\alpha$ [watts] for the short preamble sequence because the signal is transmitted from a single antenna. In contrast, for the long preamble sequence, signal field, and data signal, the transmission output of each antenna is $\alpha/N$ [watts] because these signals are transmitted from all antennas.

Accordingly, in a path which transmits the short preamble sequence by using a single antenna, N-fold transmission output is required only to transmit the short preamble. That is, a transmission path for the short preamble produces the redundancy that the specifications of an up converter and power amplifier are required to be able to control the transmission output α [watts] only when the short preamble sequence is transmitted. On the transmission side as described above, a plurality of transmitters corresponding to a plurality of transmit antennas cannot be given equal structures, and this complicates the whole transmitter apparatus. In addition, since the power consumption of the transmitter apparatus strongly depends on the transmission output level, this is not advantageous in achieving low power consumption.

BRIEF SUMMARY OF THE INVENTION

The first aspect of the present invention provides a wireless transmitting method of performing transmission by an orthogonal frequency division multiplexing (OFDM) using a plurality of subcarriers orthogonal to each other, the method comprising: transmitting, by using a plurality of transmit antennas, a plurality of preambles formed of a plurality of different subcarrier groups selected from a plurality of subcarriers; and transmitting a data by using the plurality of transmit antennas after the preambles are transmitted.

The second aspect of the present invention provides a wireless receiving method for an orthogonal frequency division multiplexing (OFDM) using a plurality of subcarriers orthogonal to each other, the method comprising: receiving, via a plurality of receiving antennas, a plurality of preambles containing a plurality of short preamble sequences formed of a plurality of different subcarrier groups selected from a plurality of subcarriers, and data following the preambles; amplifying the received preambles by a variable gain amplifier having a gain; and controlling the gain in response to reception of the short preamble sequences.

The third aspect of the present invention provides a wireless transmitting method with a plurality of antennas, comprising: transmitting a plurality of preamble signals with the plurality of antennas, the preamble signals being formed of a plurality of different subcarrier groups selected from a plurality of subcarriers orthogonal to each other, using an orthogonal frequency division multiplexing (OFDM) system; and transmitting a data signal with the plurality of antennas, after transmitting the preamble signals.

The fourth aspect of the present invention provides a wireless receiver apparatus comprising: a plurality of antennas; a receiver, associated with the plurality of antennas, which receives a plurality of preamble signals containing a plurality of short preamble strings formed of a plurality of different subcarrier groups selected from the plurality of subcarriers being orthogonal to each other, and a data signal following the preamble signal, using an orthogonal frequency division multiplexing (OFDM) system; a variable gain amplifier which amplifies signals received by the receiver; and a gain controller which controls a gain of the variable gain amplifier depending upon the short preamble strings of the preamble signals.

BRIEF DESCRIPTION OF THE SEVERAL VIEWS OF THE DRAWING

FIG. 1 is a view showing a wireless packet format including a preamble according to an embodiment of the present invention;

FIG. 2 is a block diagram showing a wireless transmitting device according to the embodiment of the present invention;

FIG. 3 is a block diagram showing a wireless receiving device according to the embodiment of the present invention;

FIG. 9 is a view showing the received levels of the receiving antennas for PLCP signals and data signals based on IEEE 802.11a;

FIGS. 12A to 12D are views showing the subcarrier arrangements of short preambles according to the other embodiment of the present invention;

FIGS. 14A to 14D are views showing the subcarrier arrangements of data signals.

DETAILED DESCRIPTION OF THE INVENTION

Figure 4A:
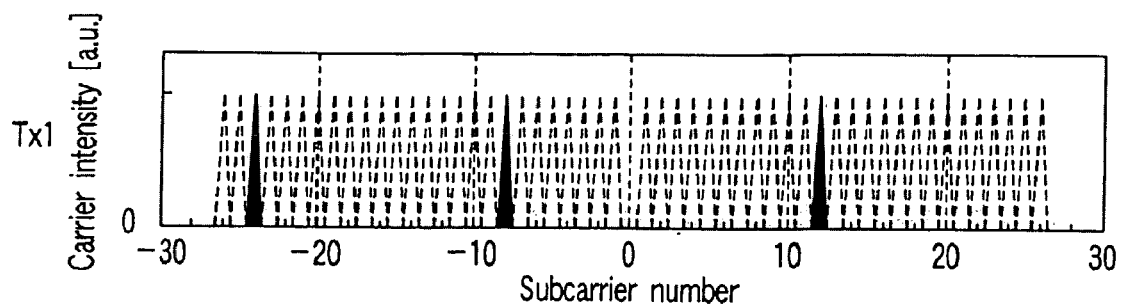
FIGS. 4A to 4D are views showing the subcarrier arrangements of short preambles shown in FIG. 1.
Figure 4B:
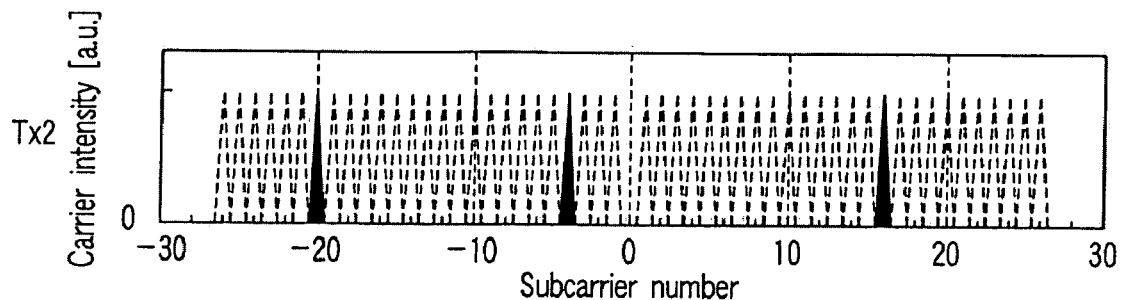
Figure 4C:
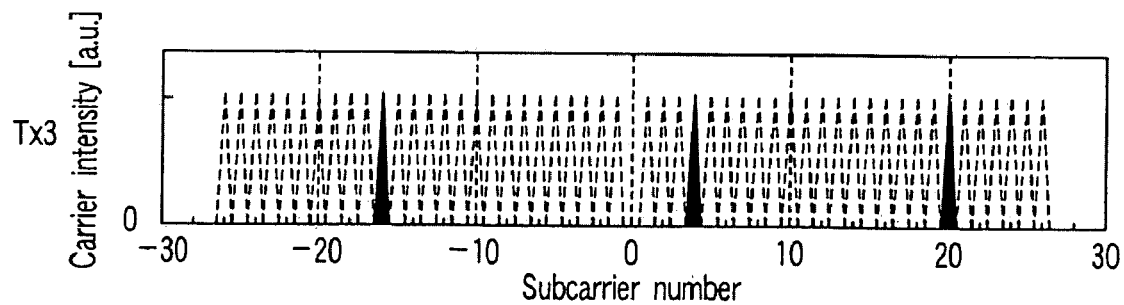
Figure 4D:
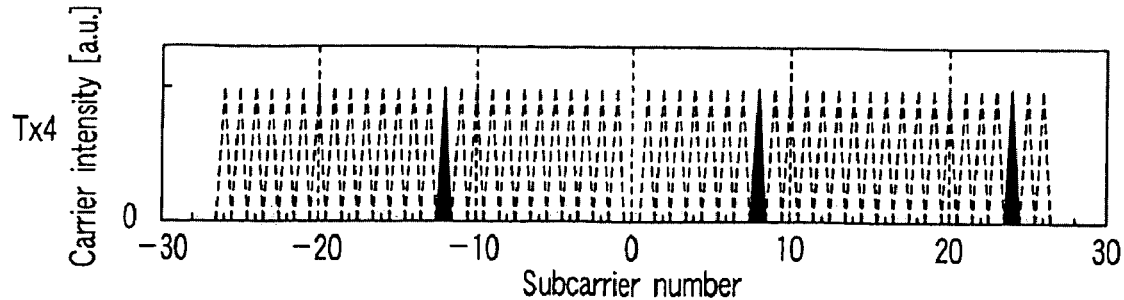
Figure 5A:
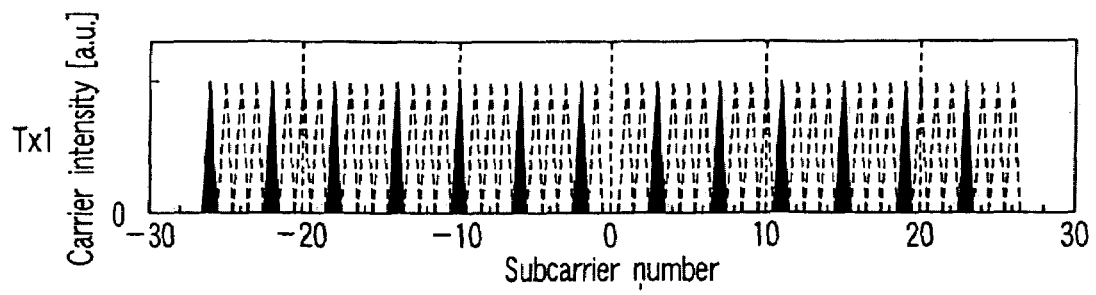
FIGS. 5A to 5D are views showing the subcarrier arrangements of long preambles and signal fields shown in FIG. 1.
Figure 5B:
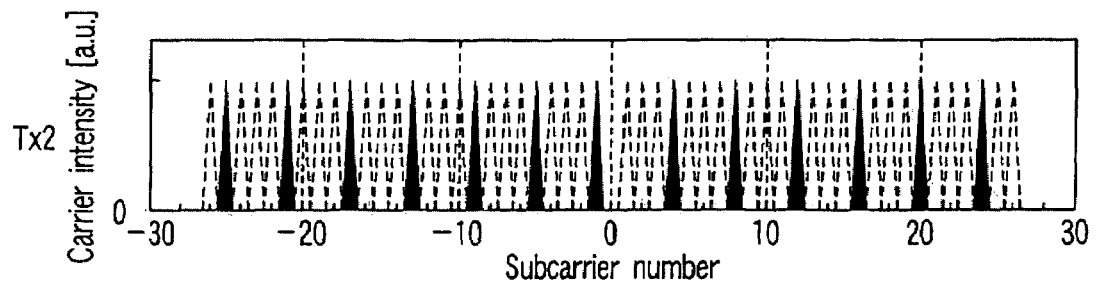
Figure 5C:
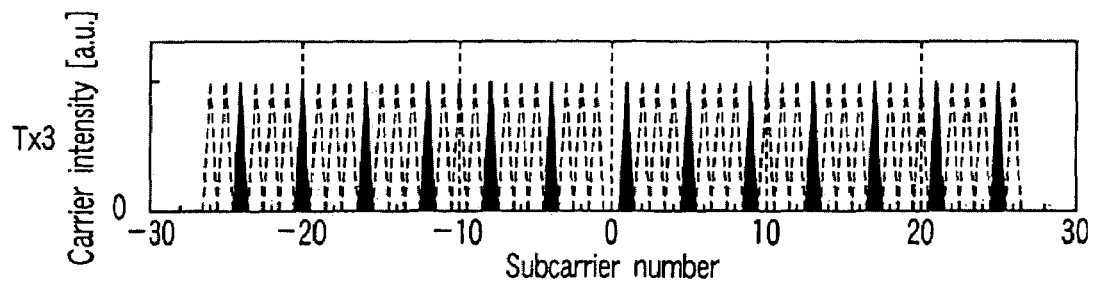
Figure 5D:
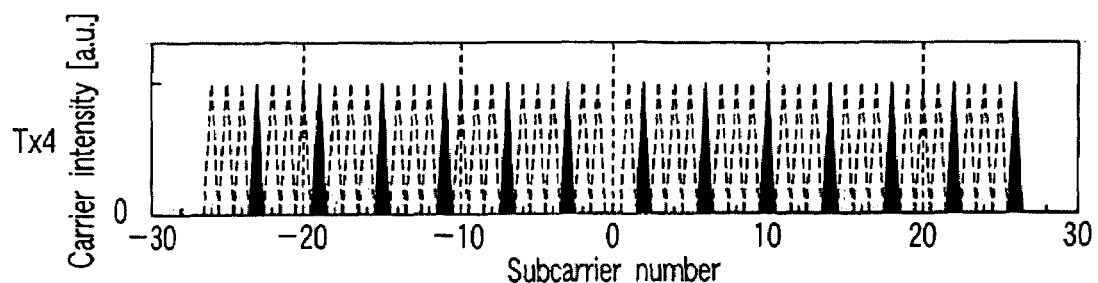

Embodiments of the present invention will be described in detail below with reference to the accompanying drawing.

A preamble according to an embodiment of the present invention contains first to fourth physical layer convergence protocol (PLCP) signals 11 to 14 transmitted from transmit antennas Tx1 to Tx4. The PLCP signals 11 to 14 includes short preamble sequences 1A to 1D, long preamble sequences 2A to 2D, first signal fields (Sig1) 3A to 3D, and second signal fields (Sig2) 4A to 4D. The transmit antenna Tx1 transmits the short preamble sequence 1A, long preamble sequence 2A, first signal field 3A, and second signal field 4A of the first PLCP signal 11 in order. Likewise, the antenna Tx2 transmits 1B, 2B, 3B, and 4B of the second PLCP signal 12 in order, the antenna Tx3 transmits 1C, 2C, 3C, and 4C of the third PLCP signal 13 in order, and the antenna Tx4 transmits 1D, 2D, 3D, and 4D of the fourth PLCP signal 14 in order.

Unit preambles SP contained in the short preamble sequences 1A to 1D and unit preambles LP contained in the long preamble sequences 2A to 2D are signal sequences having predetermined lengths. The length of LP is relatively larger than that of SP. After transmitting the PLCP signals 11 to 14, i.e., the second long preamble sequences 4A to 4D, the antennas Tx1 to Tx4 transmit data signals (DATA) 5.

The short preamble sequences 1A to 1D, long preamble sequences 2A to 2D, and first signal fields 3A to 3D are based on IEEE 802.11a standard. The second fields 4A to 4D are not based on IEEE 802.11a standard, but contain information such as the modulation coding scheme and data length of wireless packet for communication by MIMO technique. The second signal fields 4A to 4D are desirably based upon IEEE 802.11n currently being in standardization process.

Guard intervals GI are arranged between the short preamble sequences 1A to 1D and the long preamble sequences 2A to 2D, between the long preamble sequences 2A to 2D and the first signal fields 3A to 3D, between the first signal fields 3A to 3D and the second signal fields 4A to 4D, and between the second signal fields 4A to 4D and the data signals 5. In the preamble based on IEEE 802.11a, GI7 having a double length is placed before each of the long preamble sequences 2A to 2D.

The short preamble sequences 1A to 1D are mainly used in timing synchronization, AGC, and coarse adjustment of AFC for frequency synchronization. The long preamble sequences 2A to 2D are mainly used in fine adjustment of AFC, and signal processing for channel estimation. The first signal fields 3A to 3D are based on IEEE 802.11a, and transmitted as OFDM symbols. In the first signal fields 3A to 3D, the modulation coding scheme of the data signals 5 following the PLCP signals 11 to 14, the length of a wireless packet, and the like are described. Therefore, a wireless receiving device based on IEEE 802.11a can perform a normal receiving operation. During the interval of the data signals 5 following the PLCP signals 11 to 14, no other wireless transmitting device based on IEEE 802.11a starts transmission and destroys wireless packets.

The PLCP signals 11 to 14 can meet IEEE 802.11a standard during the interval from the short preamble sequences 1A to 1D to the first signal fields 3A to 3D. This makes it possible to construct an MIMO-OFDM system capable of matching both IEEE 802.11a and another wireless LAN standard (e.g., IEEE 802.11n).

In this embodiment, the second signal fields 4A to 4D describing the modulation coding scheme for communication by using MIMO and the length of a wireless packet are inserted in the endmost portions of the PLCP signals 11 to 14. The receiving side demodulates the second signal fields 4A to 4D, and recognizes, e.g., the modulation coding scheme of signals transmitted from the antennas Tx1 to Tx4, the wireless packet length, and the MIMO operation. Therefore, the receiving side can recognize that the data signals 5 following the PLCP signals 11 to 14 are wireless packets based on a wireless LAN standard (e.g., IEEE 802.11n) other than IEEE 802.11a, and perform a receiving operation as the MIMO-OFDM system.

FIGS. 2 and 3 show a wireless transmitting device 200 and wireless receiving device 300 according to this embodiment which implements the MIMO-OFDM system. The wireless transmitting device 200 shown in FIG. 2 includes transmit antennas 205A to 205D, wireless transmitters 204A to 204D, a digital modulator 203, and a memory 202. The wireless receiving device 300 shown in FIG. 3 includes receiving antennas 301A to 301D, wireless receivers 302A to 302D, channel estimators 303A to 303D for performing channel impulse response estimation (channel estimation) on the basis of information from the wireless receivers 302A to 302D, and a digital demodulator 304.

The transmit antennas 205A, 205B, 205C, and 205D shown in FIG. 2 correspond to Tx1, Tx2, Tx3, and Tx4, respectively, shown in FIG. 1. In this embodiment, the numbers of the transmit antennas and receiving antennas are four. However, the number of the transmit antennas is not limited to four and can be any plural number. The number of the receiving antennas may also be one or any plural number other than four. The numbers of the transmit antennas and receiving antennas need not be equal.

A practical operation of the wireless transmitting device 200 shown in FIG. 2 will be explained below. First, the digital modulator 203 modulates transmission data 201 and an output preamble from the memory 202 to assemble a wireless packet. The output preamble from the memory 202 corresponds to the first to fourth PLCP signals 11 to 14 shown in FIG. 1.

The assembled wireless packet undergoes processing necessary for transmission performed by the transmitters 204A to 204D, e.g., digital to analog conversion, frequency conversion (up conversion) to the radio frequency (RF) band, and power amplification. After that, the wireless packet is supplied to the transmit antennas 205A to 205D corresponding to the antennas Tx1 to Tx4 shown in FIG. 1. As a consequence, the RF signal is transmitted from the transmit antennas 205A to 205D to the wireless receiving device shown in FIG. 3. In the following explanation, the transmit antennas 205A to 205D are Tx1 to Tx4 shown in FIG. 1.

The transmitted RF signal is based on an OFDM signal, and contains a plurality of subcarriers of the OFDM signal. The first to fourth PLCP signals 11 to 14 shown in FIG. 1 are simultaneously transmitted from the transmit antennas 205A to 205D as subcarriers allocated to the transmit antennas 205A to 205D while frequency orthogonal conditions are maintained.

Generally, in the OFDM signal based on IEEE 802.11a, the short preamble sequences 1A to 1D contain 12 subcarriers, and the long preamble sequences 2A to 2D, the first signal fields 3A to 3D, second signal fields 4A to 4D, and data signals 5 contain 52 subcarriers.

As shown in FIGS. 4A to 5D, the first to fourth PLCP signals 11 to 14 are transmitted as different subcarrier groups from the transmit antennas 205A to 205D (corresponding to Tx1 to Tx5 in FIG. 1). FIGS. 4A to 4D illustrate the arrangements of 12 subcarriers in the short preamble sequences 1A to 1D shown in FIG. 1. FIGS. 5A to 5D illustrate the arrangements of 52 subcarriers in the long preamble sequences 2A to 2D and first signal fields 3A to 3D in FIG. 1. Referring to FIGS. 4A to 5D, the abscissa indicates the positions where the subcarriers are arranged, and the ordinate indicates the subcarrier numbers. The dotted lines indicate subcarrier positions where subcarriers can be arranged, and the solid portions represent that subcarriers are actually arranged.

The subcarrier numbers are 0 in the center of the signal band of the OFDM signal, negative numbers on the lower sideband side, and positive numbers on the upper sideband side. No subcarrier is placed in a position where the subcarrier number is "0", and 52 subcarriers are arranged in the positions of subcarrier numbers ±1 to ±26. For example, as shown in FIGS. 4A to 4D, 12 subcarriers of the short preamble sequences 1A to 1D are arranged in the positions of subcarrier numbers ±24, ±20, ±16, ±12, ±8, and ±4 on the basis of IEEE 802.11a.

As a subcarrier dividing method, i.e., as a method of allocating a plurality of subcarriers of the OFDM signal to the first to fourth PLCP signals 11 to 14, the embodiment of the present invention uses a method, as shown in FIGS. 4A to 5D, by which subcarriers are sequentially selected and allocated one by one to the PLCP signals 11 to 14 in order of subcarrier arrangement (order of subcarrier number).

For example, the allocation of subcarriers to the short preamble sequences 1A to 1D of the first to fourth PLCP signals 11 to 14 is as shown in FIG. 4A to 4D. That is, subcarriers having subcarrier numbers −24, −8, and +12 are allocated to the short preamble 1A. Subcarriers having subcarrier numbers −20, −4, and +16 are allocated to the short preamble sequence 1B. Subcarriers having subcarrier numbers −16, +4, and +20 are allocated to the short preamble sequence 1C. Subcarriers having subcarrier numbers −12, +8, and +24 are allocated to the short preamble sequence 1D. In this manner, the phases of subcarriers allocated to the short preambles 1A to 1D are shifted by four waves.

The allocation of subcarriers to the long preamble sequences 2A to 2D of the first to fourth PLCP signals 11 to 14 is basically the same as the allocation of subcarriers to the short preamble sequences 1A to 1D described above, except that the phases of those subcarriers allocated to the long preambles 2A to 2D are shifted by one wave as shown in FIGS. 5A to 5D.

The PLCP signals 11 to 14 containing the subcarrier groups divided as shown in FIGS. 4A to 5D are transmitted from the transmit antennas 205A to 205D. The data signals 5 following the PLCP signals 11 to 14 are transmitted by MIMO channels. That is, the transmitters 204A to 204D generate different OFDM signals corresponding to the individual data signals 5. These OFDM signals are transmitted as four RF signals, corresponding to the number of the transmitters 204A to 204D, from the transmit antennas 205A to 205D.

In the wireless transmitting device according to this embodiment as described above, the four PLCP signals 11 to 14 are transmitted, from the transmit antennas 205A to 205D by the transmitters 204A to 204D, as four subcarrier groups obtained by dividing a plurality of subcarriers of one OFDM signal. On the other hand, the four data signals 5 are transmitted as different OFDM signals generated by the transmitters 204A to 204D from the transmit antennas 205A to 205D.

When subcarriers are uniformly divided in accordance with the transmit antennas 205A to 205D, the PLCP signals 11 to 14 are transmitted at equal levels (transmission powers) from the transmit antennas 205A to 205D. Even when subcarriers are not uniformly divided, the PLCP signals 11 to 14 are transmitted at substantially equal levels. For example, when the number of the transmit antennas 205A to 205D is four as in this embodiment, the transmit antennas 205A to 205D transmit three subcarriers for each of the short preamble sequences 1A to 1D, and transmit 13 subcarriers for each of the long preamble sequences 2A to 2D and signal fields 3A to 3D and 4A to 4D. When the number of the transmit antennas is three, each transmit antenna transmits four subcarriers for each of the short preamble sequences 1A to 1C, and 17 or 18 subcarriers for each of the long preamble sequences 2A to 2C and signal fields 3A to 3C and 4A to 4C.

Since the data signals 5 are not divided into subcarriers unlike the PLCP signals 11 to 14, the data signals 5 have a subcarrier arrangement different from the PLCP signals 11 to 14. However, a total of 52 subcarriers are transmitted as the data signals 5 from the transmit antennas 205A to 205D, so the transmission level of the data signals 5 is equivalent to that of the PLCP signals 11 to 14. As described above, the transmission levels of the transmit antennas 205A to 205D are equal between the PLCP signals 11 to 14 and the data signals 5, and substantially equal between the transmit antennas 205A to 205D. Therefore, the transmitters 204A to 204D can have identical structures having the same output level. Furthermore, the output level of each of the transmitters 204A to 204D can be decreased in proportion to the number of antennas, against the total output level of the transmitter apparatus 200. This makes it possible to reduce the current consumption by suppressing the output power of the power amplifiers used in the transmitters 204A to 204D, and alleviate the distortion characteristics. That is, it is possible to simplify the transmitter apparatus 200, and thereby realize low power consumption.

The operation of the wireless receiving device 300 shown in FIG. 3 will be explained below. The RF signals transmitted from the wireless receiving device 200 shown in FIG. 2 are received by the receiving antennas 301A to 301D. The wireless receiving device 300 may also have a single receiving antenna. The RF received signals from the receiving antennas 301A to 301D are input to the receivers 302A to 302D. The receivers 302A to 302D perform receiving processes, e.g., frequency conversion (down conversion) from the RF band to the baseband (BB), AGC, and analog to digital conversion, thereby generating baseband signals.

These baseband signals from the receivers 302A to 302D are input to the channel estimators 303A to 303D and digital demodulator 304. The channel estimators 303A to 303D estimate channel impulse responses from the wireless transmitting device 200 shown in FIG. 2 to the wireless receiving device 300 shown in FIG. 3. The channel demodulator 304 demodulates the baseband signals in accordance with the channel impulse responses estimated by the channel estimators 303A to 303D, and generates received data 305 corresponding to the transmission data 201 shown in FIG. 2.

More specifically, the digital demodulator 304 has a channel equalizer on the input stage. This channel equalizer performs equalization for removing distortion of the received signals from the channels in accordance with the estimated channel impulse responses. The digital demodulator 304 demodulates the equalized signals at an adequate demodulation timing based on the timing synchronization process described above, and reproduces the data.

Figure 6:
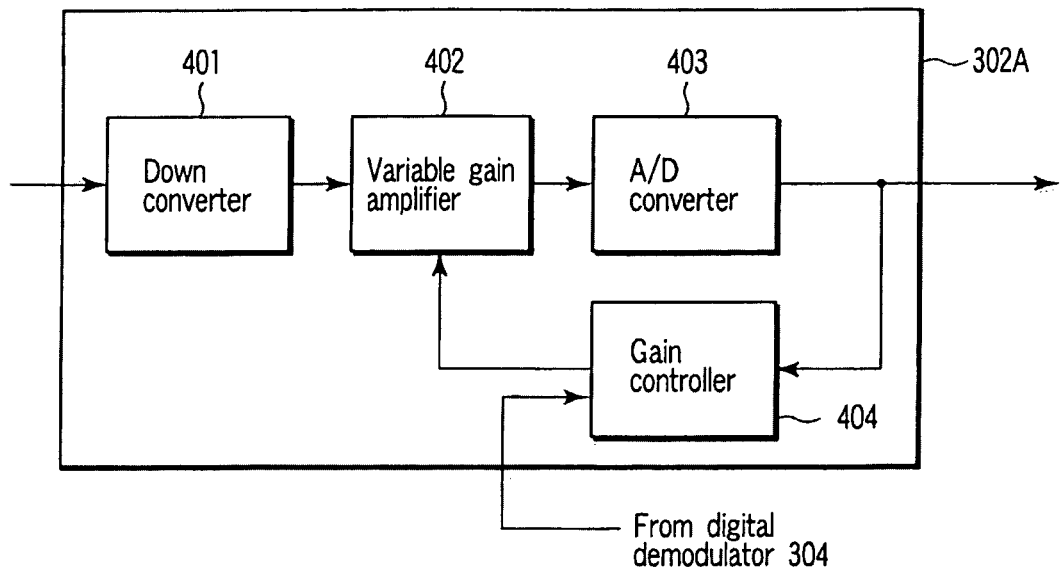
FIG. 6 is a block diagram showing a receiver shown in FIG. 3.

The receivers 302A to 302D shown in FIG. 3 will be described below. FIG. 6 shows details of the receiver 302A. Since the receivers 302B to 302D are the same as the receiver 302A, only the receiver 302A will be explained. A down converter 401 down-converts the RF received signal input from the receiving antenna 301, and generates a baseband signal. The down converter 401 can convert the RF received signal into the baseband either directly or after converting the signal into an intermediate frequency (IF) band.

The baseband signal generated by the down converter 401 is input to a variable gain amplifier 402, and AGC, i.e., signal level adjustment is performed. The output signal from the variable gain amplifier 402 is converted into a digital signal by an analog to digital converter 403. The digital signal from the analog to digital converter 403 is output outside the receiver 302, and also input to a gain controller 404. The gain controller calculates the gain in accordance with the digital signal from the analog to digital converter 403, and controls the gain of the variable gain amplifier 402 on the basis of the calculation. Details of AGC will be described later.

The operation performed by the wireless receiving device 300 to receive a transmission signal containing the PLCP signals 11 to 14 shown in FIG. 1 will be described below. First, the wireless receiving device 300 receives the short preamble sequences 1A to 1D transmitted from the transmit antennas 205A to 205D shown in FIG. 2, and coarsely adjusts frame start detection, timing synchronization, AGC, and AFC by using baseband signals corresponding to the short preamble sequences 1A to 1D. In response to the reception of the short preamble sequences 1A to 1D, the digital demodulator 304 sends a command signal to the receivers 302A to 302D to perform AGC.

In the following description, the gain controller 404 measures the received level from the analog to digital-converted received signal and calculates the gain. However, it is also possible to measure the received level by analog detection of an RF-band or IF-band received signal, and calculate the gain. The variable gain amplifier 402 amplifies the baseband signals corresponding to the short preamble sequences 1A to 1D in accordance with a predetermined initial gain. The output signal from the variable gain amplifier 402 is input to the gain controller 404 via the analog to digital converter 403. The gain controller 404 calculates the gain from the level after analog to digital conversion of the received signals corresponding to the short preamble sequences 1A to 1D, and controls the gain of the variable gain amplifier 402 in accordance with the calculated gain.

Letting X be the level before analog to digital conversion of the baseband signals corresponding to the short preamble sequences 1A to 1D. If the level X is high, the baseband signals exceed the upper limit of the input dynamic range of the analog to digital converter 403, so a digital signal obtained by analog to digital conversion saturates. This particularly distorts high-level signals. If the level X is low, large quantization errors caused by analog to digital conversion are contained particularly in low-level signals. That is, regardless of whether the level X is high or low, the analog to digital converter 403 does not perform any adequate conversion, and this largely degrades the reception quality.

To solve this problem, the gain controller 404 controls the gain of the variable gain amplifier 402 such that a level Y after analog to digital conversion of the baseband signals corresponding to the short preamble sequences 1A to 1D is a predetermined target value Z. If the level of the baseband signals is very high to such an extent that all input signals to the analog to digital converter 403 saturate, or if the level is very low, it is sometimes impossible to appropriately control the gain of the variable gain amplifier 402 by one-time control. In this case, gain control is repeated. Consequently, the level of the baseband signals input to the analog to digital converter 403 can be adjusted to an adequate level falling within the input dynamic range of the analog to digital converter 403. By thus controlling the gain of the variable gain amplifier 402 by using the baseband signals corresponding to the short preamble sequences 1A to 1D, appropriate analog to digital conversion can be performed, so deterioration of the reception quality can be avoided.

AGC can be either individually performed for the receivers 302A to 302D, or collectively performed for the receivers 302A to 302D by using, as a target value, a received level obtained by measuring one specific receiver or the highest received level. Although the former method will be explained in this embodiment, the latter method may also be used. Accordingly, the same AGC is individually performed for the receivers 302A to 302D, and the gain of the variable gain amplifier 402 is adjusted for each of the receiving antennas 301A to 301D.

Figure 7:
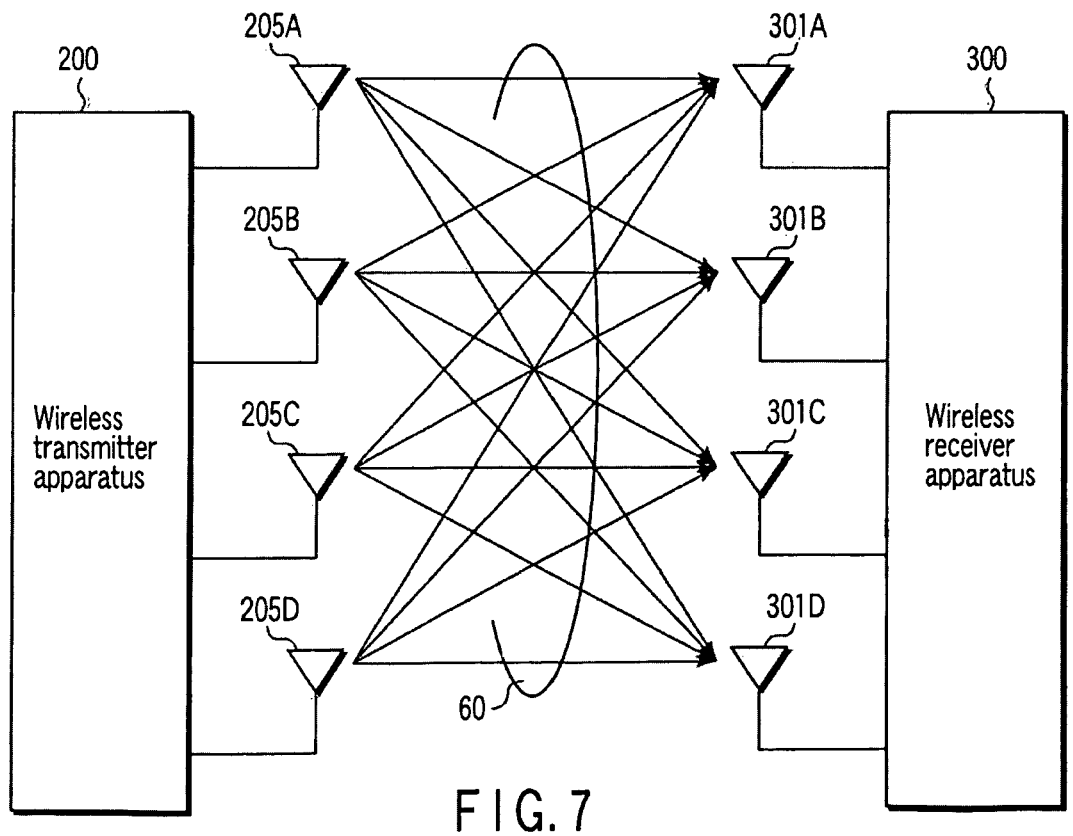
FIG. 7 is a view showing channel impulse response of an MIMO-OFDM system according to the embodiment of the present invention.

As described previously, the short preamble sequences 1A to 1D are transmitted from the transmit antennas 205A to 205D after being divided into subcarriers, and received by the receiving antennas 301A to 301D. As shown in FIG. 7, therefore, the fading statuses of all channel impulse response 60 between the transmit antennas 205A to 205D and the receiving antennas 301A to 301D are accurately transmitted to the receiver apparatus 300. In this embodiment, the four transmit antennas 205A to 205D and four receiving antennas 301A to 302D are used, so the number of the channel 60 is 16 as shown in FIG. 7.

The statuses of the channel 60 when the short preamble sequences 1A to 1D are transmitted are equal to those of the channel 60 when the long preamble sequences 2A to 2D, first signal fields 3A to 3D, second signal fields 4A to 4D, and data signals 5 are transmitted. Therefore, unlike in the case proposed by Jan Boer et al. in which short preamble sequences are transmitted from a single antenna, the receiver apparatus 300 can accurately recognize the fading statuses of the channel 60 when the short preamble sequences 1A to 1D, long preamble sequences 2A to 2D, first signal fields 3A to 3D, second signal fields 4A to 4D, and data signals 5 are transmitted. Accordingly, AGC can be accurately performed for each of the receivers 302A to 302D.

Figure 8:
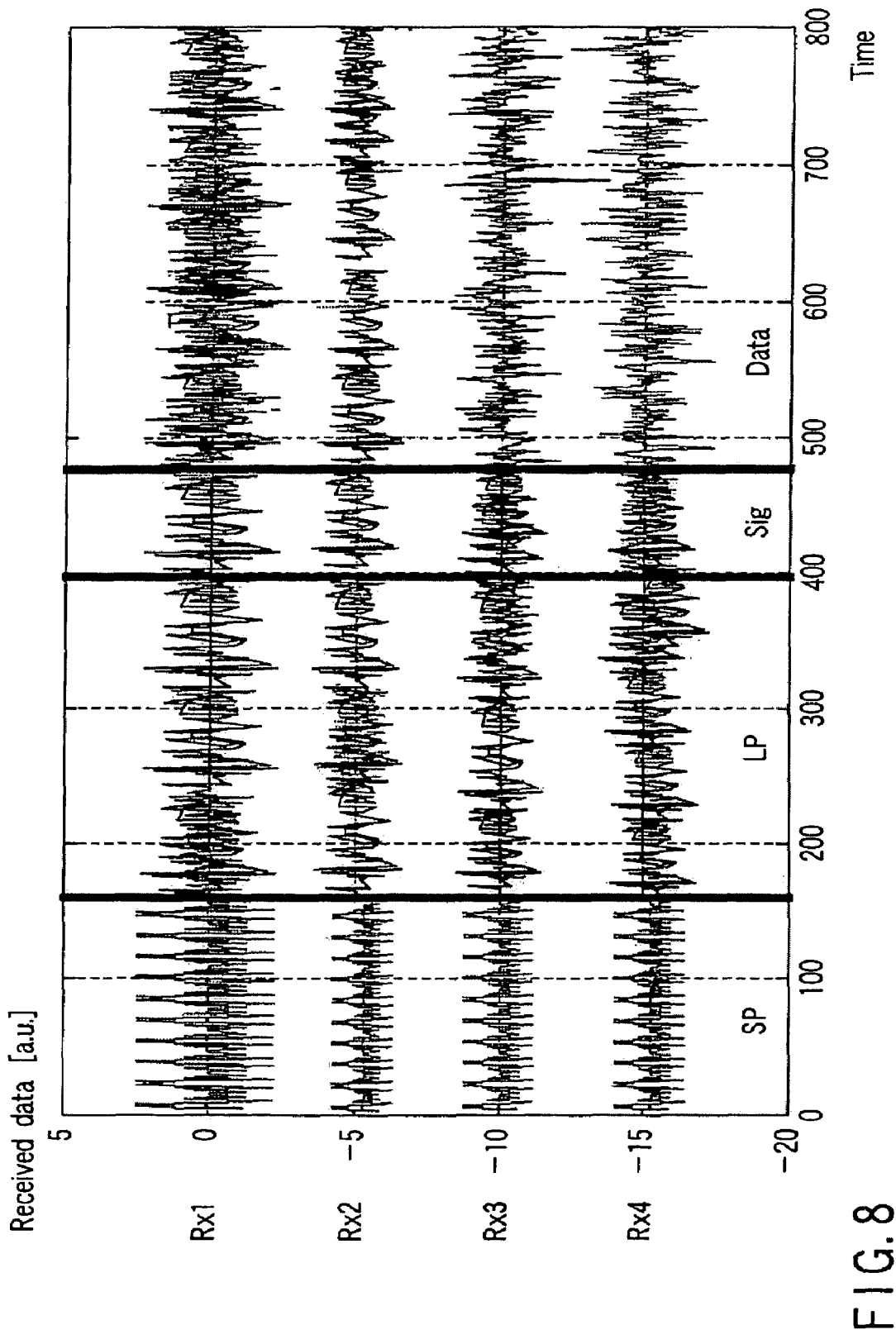
FIG. 8 is a view showing the received levels of receiving antennas for PLCP signals and data signals according to the embodiment of the present invention.
Figure 9:
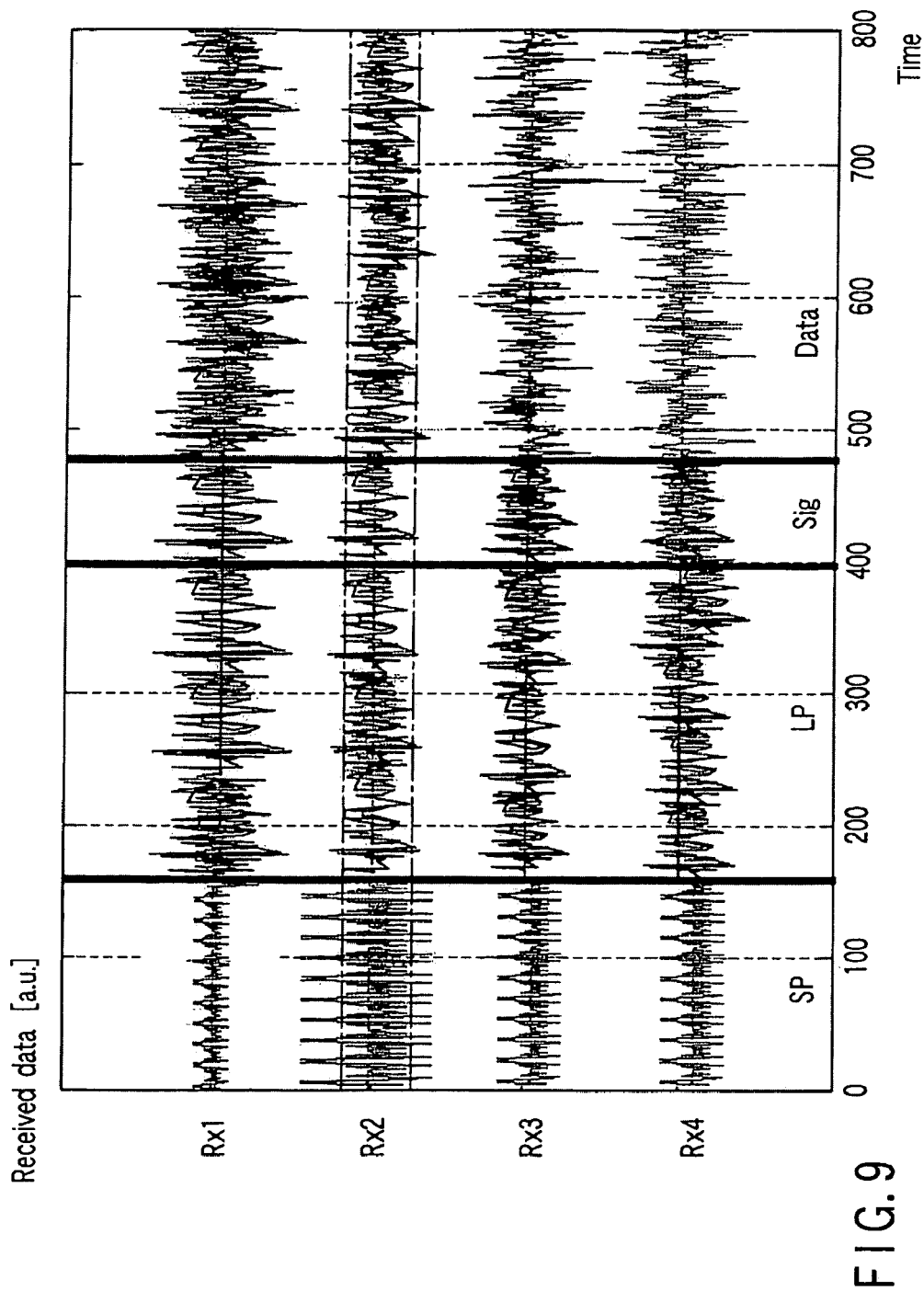

This effect will be explained below with reference to FIGS. 8 and 9. Referring to FIGS. 8 and 9, the abscissa indicates the reception time of the preambles and data signals, and the ordinate indicates the received levels of the receiving antennas Rx1 to Rx4 with respect to the preambles and data signals. FIG. 8 shows this embodiment, and FIG. 9 shows the case proposed by Jan Boer et al. In FIG. 8, reference symbol SP represents the received levels of the short preamble sequences 1A to 1D; LP, the received levels of the long preamble sequences 2A to 2D; Sig, the received levels of the first signal fields 3A to 3D and second signal fields 4A to 4D; and Data, the received levels of the data signals 5. FIG. 9 shows examples of the received levels of short preamble sequences SP, long preamble sequences LP, signal fields Sig, and data signals Data assumed in practice when the preambles by Jan Boer et al. are transmitted in the MIMO-OFDM system.

The received levels of Rx1 and Rx2 corresponding to the receiving antennas 301A and 301B will be described in detail below. To clearly distinguish between the received levels of LP, Sig, and Data received by Rx1 and Rx2, alternate long and short dashed lines and alternate long and two short dashed lines are added to FIGS. 8 and 9. As shown in FIG. 8, at the receiving antennas 301A to 301D, the received levels of the short preamble sequences 1A to 1D match the received levels of the long preamble sequences 2A to 2D, first signal fields 3A to 3D, second signal fields 4A to 4D, and data signals 5. For example, the received level of SP and the received levels of LP, Sig, and Data at Rx1 and Rx2 shown in FIG. 8 are uniform as indicated by the alternate long and short dashed lines and alternate long and two short dashed lines. On the other hand, as shown in FIG. 9 indicating the case by Jan Boer et al., at some receiving antennas the received level of the short preamble sequences SP is different from the received levels of the long preamble sequences LP, signal fields Sig, and data signals Data. For example, at the antenna Rx1, the received level of SP is lower than the alternate long and short dashed lines and alternate long and two short dashed lines indicating the received levels of LP, Sig, and Data. At the antenna Rx2, the received level of SP is higher than the received levels of LP, Sig, and Data. The reasons are as follows.

A general MIMO-OFDM system has an MIMO transmitter, a plurality of transmit antennas, a plurality of receiving antennas, and an MIMO receiver. In this MIMO-OFDM system, when the transmit antennas and receiving antennas are spatially separated from each other, channel from given transmit antennas to given receiving antennas are independent of each other. Therefore, the correlations between these channel are low. For this reason, even when transmission signals of equal powers are transmitted from these transmit antennas, the levels of these signals received by the receiving antennas are naturally different.

According to the proposition by Jan Boer et al. in which short preamble sequences are transmitted only from the transmit antenna Tx1, of the 16 channel impulse response between the four transmit antennas Tx1 to Tx4 and the four receiving antennas Rx1 to Rx4 shown in FIG. 7, the short preamble sequences propagate on only four channel from Tx1 to Rx1, Rx2, Rx3, and Rx4, and do not propagate on the 12 remaining channel from Tx2, Tx3, and Tx4 to Rx2, Rx3, and Rx4. That is, since the channel are different, a phenomenon occurs at high probability in which received levels when the receiver receives the long preamble sequences LP, signal fields Sig, and data signals Data transmitted from the transmit antennas Tx2 to Tx4 are much higher or lower than the received level assumed by using the short preamble sequences SP transmitted from the transmit antenna Tx1.

On the other hand, when the short preamble sequences 1A to 1D, long preamble sequences 2A to 2D, first signal fields 3A to 3D, and second signal fields 4A to 4D are transmitted from the antennas 205A to 205D in accordance with the embodiment of the present invention, the short preamble sequences 1A to 1D propagate on the same 16 channel, shown in FIG. 7, as the long preamble sequences 2A to 2D, first signal fields 3A to 3D, second signal fields 4A to 4D, and data signals 5. Consequently, at the receiving antennas Rx1 to Rx4, the received levels of the short preamble sequences 1A to 1D match the received levels of the long preamble sequences 2A to 2D, first signal fields 3A to 3D, second signal fields 4A to 4D, and data signals 5.

For example, compare the received level of the short preamble sequences SP and the received levels of the long preamble sequences LP, signal fields Sig, and data signals Data at the receiving antenna Rx2 shown in FIGS. 8 and 9. In this case, in AGC using the short preamble sequences 1A to 1D based on this embodiment, the received level of the short preamble sequences is equal to the received levels of the long preamble sequences, signal fields, and data signals as shown in FIG. 8. This realizes fine AGC. That is, since the accuracy of AGC performed using the short preamble sequences increases, it is possible to avoid saturation or the increase in quantization error when the received signals are converted into digital signals by the analog to digital converter 403. Consequently, wireless communication can be performed at a high transmission rate by suppressing communication errors of data signals.

When AGC control can be performed at high accuracy by using the short preamble sequences, the following effects are also obtained. That is, since received signals input to the analog to digital converter 403 in each of the receivers 302A to 302D are adjusted to adequate levels, channel estimation using the long preamble sequences can be rapidly performed. In addition, since channel estimation can be performed by using accurate digital signals, the estimation accuracy of the channel impulse response can be increased.

In this embodiment as described above, the transmitters 204A to 204D can be designed by the same level diagram in the transmission states of all the short preamble sequences, long preamble sequences, first and second signal fields, and data signals. This simplifies the wireless transmitting device 200. Also, the output level of the transmitters 204A to 204D is 1/(the number of antennas) of the total output level of the transmitter apparatus 200. This makes downsizing of the power amplifier in the final stage and lower power consumption feasible.

Since the channel impulse response of the short preamble sequences are the same as the channel impulse response of the long preamble sequences, first and second signal fields, and data signals, AGC using the short preamble sequences can maintain high accuracy capable of tracking level variations with respect to transmission from a plurality of transmit antennas. Accordingly, the reception quality can be increased by suppressing the influence of saturation or quantization errors in the analog to digital converter. Furthermore, since the reception accuracy increases, the number of bits of the analog to digital converter for converting received signals into digital signals can be reduced. This makes low power consumption of the receiver apparatus possible.

Figure 10:
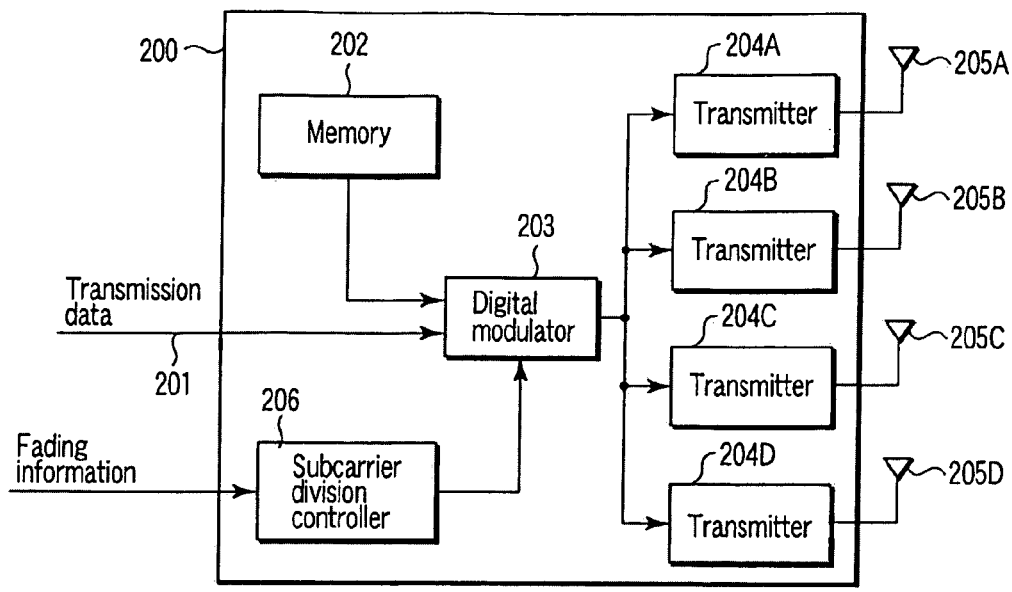
FIG. 10 is a block diagram showing a wireless transmitting device according to another embodiment of the present invention.

Another embodiment of the present invention will be described below. In the other embodiment of the present invention, as shown in FIG. 10, a wireless transmitting device 200 additionally has a subcarrier division controller 206 connected to a digital modulator 203. A memory 202, transmitters 204, and transmit antennas 205 are the same as in FIG. 2, so an explanation thereof will be omitted.

The frequency fading statuses of the channel impulse response 60 shown in FIG. 7 of the MIMO-OFDM system can be detected by the known method. The subcarrier division controller 206 shown in FIG. 10 receives channel fading detection information indicating that fading is short-delay fading having a relatively short delay time or long-delay fading having a relatively long delay time. To detect the channel fading, the frequency response, included in the transmitting device 200, of a received signal of a receiving device 300 can be used as a reference. It is also possible to cause the transmitting device 200 to notify the receiving device 300 of frequency response information of RF signals actually transmitted from transmit antennas 205A to 205D to receiving antennas 301A to 301D, and use this frequency response information as a reference. The propagation fading detection method may also be some other method, and is not particularly limited.

The subcarrier division controller 206 controls the digital modulator 203 in accordance with the channel fading detection information, thereby controlling the subcarrier dividing method, i.e., the allocation of subcarriers of short preamble sequences 1A to 1D, long preamble sequences 2A to 2D, first signal fields 3A to 3D, and second signal fields 4A to 4D to transmitters 204A to 204D.

Figure 11A:
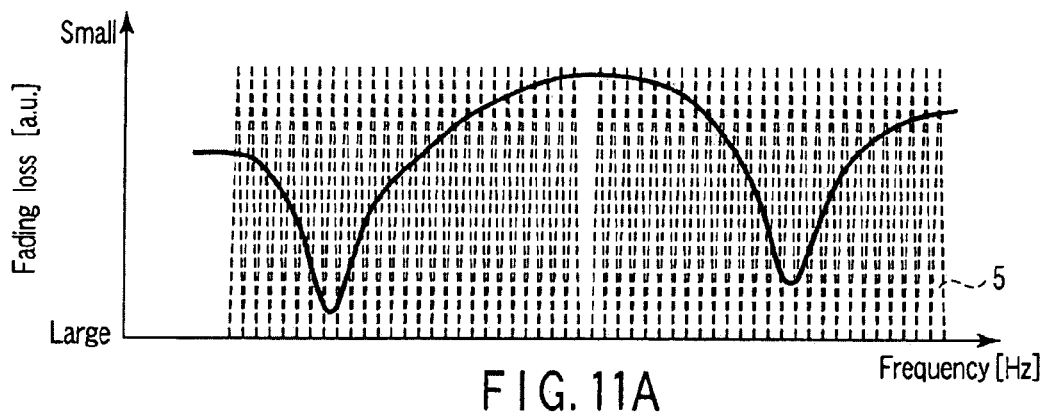
FIGS. 11A and 11B are graphs showing two typical fading characteristics used to explain the other embodiment of the present invention.
Figure 11B:
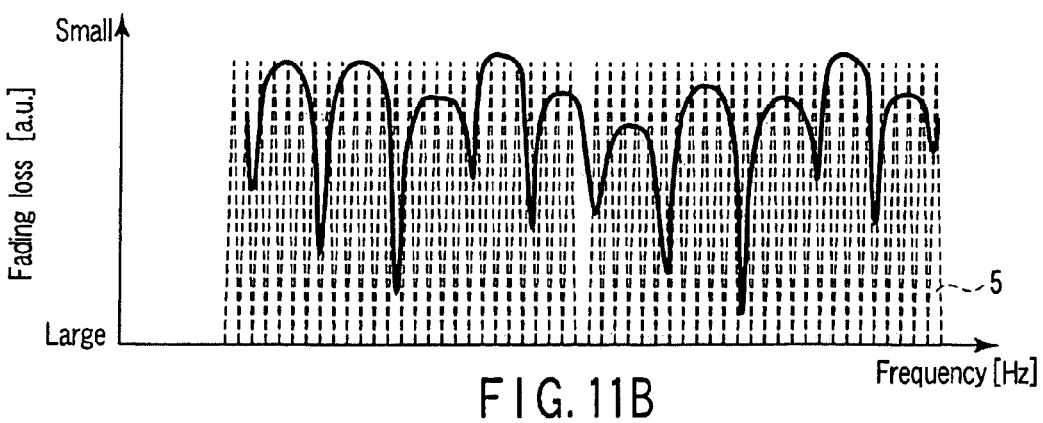
Figure 13A:
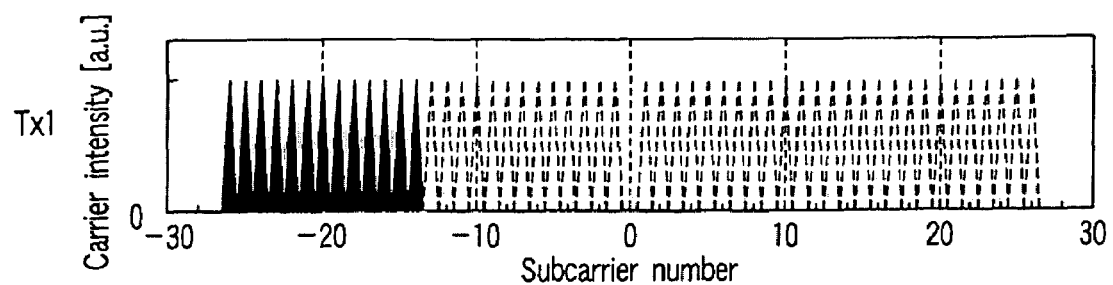
FIGS. 13A to 13D are views showing the subcarrier arrangements of long preambles and signal fields according to the other embodiment of the present invention.
Figure 13B:
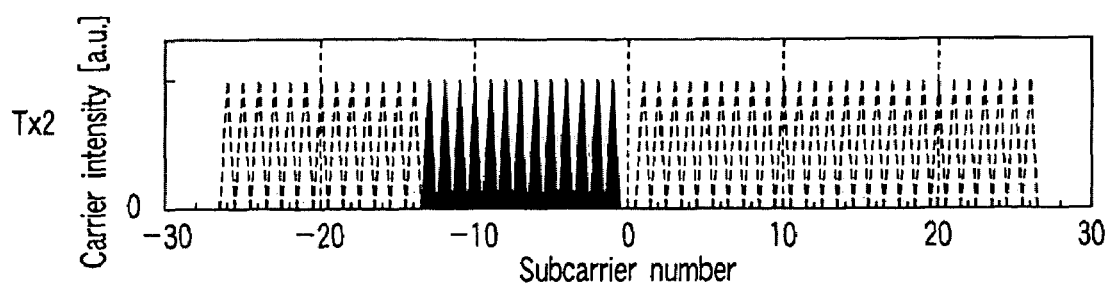
Figure 13C:
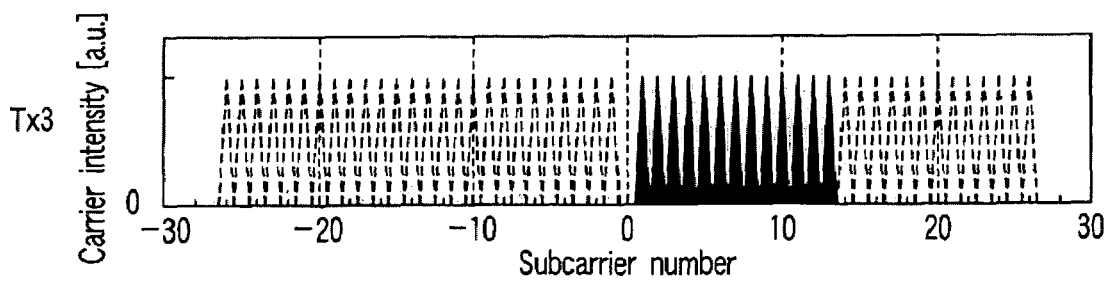
Figure 13D:
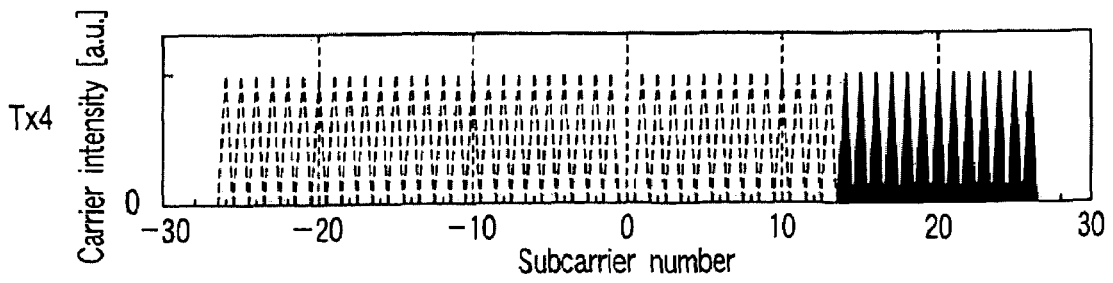

FIGS. 11A and 11B illustrate the frequency fading. FIG. 11A shows typical frequency fading in a short-delay fading environment, and FIG. 11B shows typical frequency fading in a long-delay fading environment. The frequency fading is roughly divided into these two patterns. The period of a valley in which the frequency fading loss is large is typically about a few MHz indoors. The bandwidth of an OFDM signal to be used in IEEE 802.11a or in IEEE 802.11n whose standard will be established in the future is about 20 MHz. Therefore, a plurality of fading valleys shown in FIGS. 11A and 11B are present within this OFDM signal band.

The characteristics of the two frequency fading patterns described above will be briefly summarized below. The short-delay fading shown in FIG. 11A has the characteristics that a specific signal band produces fading valleys and suffers a propagation path loss, but propagation path losses are relatively small in other bands. On the other hand, the long-delay fading shown in FIG. 11B is characterized in that fading valleys appear in the entire signal band at narrow frequency intervals, i.e., periodic bands suffer large losses. These fading characteristics are determined in a channel between a transmit antenna and a receiving antenna. Therefore, the fading statuses of the 16 channel 60 shown in FIG. 7 are not the same, but have similar tendencies.

In this embodiment, the above-mentioned characteristics of the short-delay fading and long-delay fading are taken into consideration, and the subcarrier division controller 206 switches the subcarrier dividing methods of the digital modulator 203 on the basis of the channel fading status detection information. More specifically, if the channel 60 has the short-delay fading, subcarriers are sequentially selected and allocated one by one, in order of subcarrier arrangement shown in FIGS. 4A to 5D, to first to fourth PLCP signals 11 to 14 transmitted from the transmit antennas 205A to 205D, in accordance with the subcarrier dividing method explained in the above embodiment. That is, in the first to fourth PLCP signals 11 to 14, subcarriers are allocated to the short preamble sequences 1A to 1D as shown in FIG. 4, and are allocated to the long preamble sequences 2A to 2D as shown in FIG. 5.

As shown in FIG. 11A, in the short-delay fading, the influence of a frequency fading valley is small in a remote band. Accordingly, as the subcarrier dividing method as described above, subcarriers allocated to the first to fourth PLCP signals 11 to 14 are dispersed in terms of frequency to avoid concentration of subcarriers to a band which suffers a large loss. This makes it possible to avoid the influence of a large propagation path loss caused by a frequency fading valley in a specific band.

On the other hand, if the channel 60 has the long-delay fading, as shown in FIGS. 12A to 13D, subcarriers selected from a plurality of subcarriers for each of a plurality of partial bands obtained by dividing the OFDM signal band are allocated to the first to fourth PLCP signals 11 to 14 transmitted from the transmit antennas 205A to 205D.

For example, to allocate subcarriers to the short preamble sequences 1A to 1D of the first to fourth PLCP signals 11 to 14, the whole band of the OFDM signal is divided by the number of the transmit antennas, and these divided bands are allocated to the individual transmit antennas and transmitted. As shown in FIGS. 12A to 12D, the OFDM signal band is divided into four partial bands (first to fourth partial bands), and subcarriers at a period of four waves as subcarrier numbers are selectively allocated to each partial band.

That is, three subcarriers in the first partial band having the lowest frequency are allocated to the short preamble sequence 1A, and three subcarriers in the second partial band having the second lowest frequency are allocated to the short preamble sequence 1B. Similarly, three subcarriers in the third partial band having a frequency higher than that of the second partial band are allocated to the short preamble sequence 1C, and three subcarriers in the fourth partial band having the highest frequency are allocated to the short preamble sequence 1D.

The allocation of subcarriers to the long preamble sequences 2A to 2D of the first to fourth PLCP signals 11 to 14 is basically the same as the allocation of subcarriers to the short preamble sequences 1A to 1D described above. However, a larger number of subcarriers in the individual partial bands, e.g., all subcarriers having consecutive subcarrier numbers in the partial bands in the example shown in FIGS. 13A to 13D are allocated to the long preamble sequences 2A to 2D.

In the long-delay fading as shown in FIG. 11B, frequency fading valleys periodically appear even in remote bands. However, in a narrow band of a few hundred kHz to a few MHz, e.g., in the adjacent subcarrier or the next adjacent subcarrier, large losses can be avoided on average. As shown in FIGS. 12A to 13D, therefore, subcarriers are divided for each of adjacent partial bands, and subcarrier groups close to each other in each partial band are allocated to the first to fourth PLCP signals 11 to 14. This makes it possible to avoid a large propagation path loss caused when a frequency fading valley and the subcarrier arrangement match.

That is, when a signal is transmitted from a given transmit antenna and received by a given receiving antenna, it is possible to avoid a loss caused by superposition of a subcarrier on a band which periodically appears and has a large loss, and eliminate the influence of a fading loss on a subcarrier in one of adjacent bands. Accordingly, it is possible to smoothly perform frequency synchronization, channel estimation, and MIMO channel configuration information transmission by using the long preamble sequences 2A to 2D and first signal fields 3A to 3D, without degrading the accuracy of AGC control by the short preamble sequences 1A to 1D. It is also possible to suppress the influence of saturation and quantization errors in the analog to digital converter and improve the reception quality while maintaining the accuracy of the AGC function which tracks variations in received level in the receiver apparatus.

As described earlier, in a wireless propagation environment using the MIMO-OFDM system, fading patterns having various characteristics such as short-delay fading and long-delay fading occur. By switching the subcarrier dividing methods in accordance with the fading characteristics as in this embodiment, the influence of fading can by minimized in the receiver apparatus in any wireless propagation environment. This makes it possible to maintain the accuracy of the AGC function with respect to received level variations in a wireless propagation environment, suppress the influence of saturation and quantization errors in the analog to digital converter, and thereby improve the reception quality.

The MIMO-OFDM system desirably minimizes the influence of frequency fading by which a specific band suffers a large loss, when transmitting the short preamble sequences 1A to 1D, long preamble sequences 2A to 2D, first signal fields 3A to 3D, and second signal fields 4A to 4D by subcarrier division. This is because 52 subcarriers as shown in, e.g., FIGS. 14A to 14D are arranged in the data signals 5, and this averages the influence of frequency fading.

By contrast, in a subcarrier arrangement in which bands having undergone subcarrier division as shown in FIGS. 4A to 4D or FIGS. 12A to 13D are limited to portions of the signal band, the whole transmission signal may significantly deteriorate depending on the characteristics of frequency fading. This is so because AGC adjustment using the short preambles 1 may deviate from the gain adjustment target value which is optimized when the data signals 5 are received.

In this embodiment, however, it is possible to avoid a large loss of divided subcarriers in a channel between a given transmit antenna and a given receiving antenna, regardless of the fading environment of the propagation path. This makes it possible to smoothly perform frequency synchronization, channel estimation, and MIMO channel configuration information transmission by using the long preamble sequences 2A to 2D and first signal fields 3A to 3D without degrading the accuracy of AGC control by the short preamble sequences 1A to 1D.

In the embodiments of the present invention as described above, the output levels of the transmitters can be made uniform independently of transmission information of the short preamble sequences, long preamble sequences, signal fields, and data signals. Since this eliminates the problem that the output power of one antenna increases only when the short preamble sequences are transmitted, the redundancy of the transmitters can be suppressed. Also, since the output powers of the transmitters can be made uniform at a low level, the power consumption can be reduced.

In addition, the short preamble sequences are transmitted from a plurality of antennas and used in AGC. Therefore, the input levels of the analog to digital converter and wireless receiving device can be appropriately adjusted to data simultaneously transmitted from a plurality of antennas in MIMO, and the receiving performance of the wireless receiving device can be improved. Also, since the input level of the analog to digital converter can be set at an adequate value, the number of bits of the analog to digital converter can be reduced.

Furthermore, since the short preamble sequences transmitted from a plurality of antennas are used in AGC, accurate AGC can be performed not only when data is received but also when the long preamble sequences are received. Accordingly, deterioration of the reception accuracy can be avoided. This also prevents the transmission efficiency from being decreased by insertion of an extra preamble sequence.

On the other hand, in a propagation path in which signals are transmitted from a given transmit antenna and received by a given receiving antenna, subcarriers of the short preamble sequences can be propagated while the influence of fading is minimized. Therefore, AGC which tracks received level variations on the receiving side can be made to correspond to the propagation path loss from each transmit antenna to each receiving antenna, so the reception accuracy can be increased. Furthermore, it is possible to reduce the number of bits of the analog to digital converter inserted to perform digital signal processing on received signals.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless transmitting device which performs transmission by an orthogonal frequency division multiplexing (OFDM) using a plurality of subcarriers orthogonal to each other, comprising:

a plurality of transmit antennas;

a signal generator configured to generate a signal for a wireless packet to be transmitted by using the plurality of transmit antennas, the wireless packet including a plurality of preambles formed of a plurality of different subcarrier groups selected from the plurality of subcarriers; and a transmitter configured to transmit data by using the plurality of transmit antennas after the plurality of preambles are transmitted, wherein the signal generator, (a) if a fading status of a propagation path to a wireless receiving device is short delay fading, sequentially allocates to each of the subcarrier groups of the plurality of preambles, subcarriers selected one by one from the plurality of subcarriers in order of arrangement, and, (b) if a fading status of a propagation path is long delay fading, allocates to each of the subcarrier groups of the plurality of preambles, subcarriers selected from the plurality of subcarriers for each of a plurality of partial bands obtained by dividing a signal band in which the OFDM system is used.

2. The device according to claim 1, wherein a preamble of the plurality of preambles contains a short preamble, a long preamble, and at least one signal field.

3. The device according to claim 2, wherein the at least one signal field contains a first signal field based on IEEE 802.11a.

4. The device according to claim 2, wherein the at least one signal field contains a first signal field based on IEEE 802.11a, and a second signal field placed after the first signal field and based on a standard other than IEEE 802.11a.

* * * * *